United States Patent [19]

Masuda et al.

[11] 4,119,354
[45] Oct. 10, 1978

[54] HYDRAULIC BRAKE CONTROL ASSEMBLY

[75] Inventors: Naosuke Masuda; Nobuo Sunaga, both of Higashi-Matsuyama, Japan

[73] Assignee: Jidosha Kiki Co., Ltd., Tokyo, Japan

[21] Appl. No.: 834,028

[22] Filed: Sep. 16, 1977

[30] Foreign Application Priority Data

Sep. 18, 1976 [JP] Japan .................. 51-112267

[51] Int. Cl.² .......................... B60T 8/14
[52] U.S. Cl. .................. 303/24 F; 303/6 C; 188/349
[58] Field of Search ............ 303/6 C, 24 R, 24 A, 303/24 C, 24 F; 188/349

[56] References Cited

U.S. PATENT DOCUMENTS

| | | | |
|---|---|---|---|
| 3,377,108 | 4/1968 | Eddy | 303/6 C X |
| 3,899,217 | 8/1975 | Ohta | 303/24 C |
| 3,922,020 | 11/1975 | Koike et al. | 303/24 C X |
| 4,012,079 | 3/1977 | Takeshita | 303/24 F X |
| 4,036,535 | 7/1977 | Katoh | 303/24 C X |

*Primary Examiner*—Stephen G. Kunin
*Attorney, Agent, or Firm*—Sughrue, Rothwell, Mion, Zinn and Macpeak

[57] ABSTRACT

A hydraulic brake control assembly is provided in which a proportioning valve is actuated to reduce fluid pressure to be supplied to rear cylinders from a master cylinder in accordance with the vehicle deceleration. An inertia ball is adapted to control the movement of the proportioning valve via a flexible disc valve to increase or reduce the fluid pressure supply to the rear cylinders. The disc valve is deformable to open the proportioning valve if the pressure of the master cylinder exceeds a predetermined level.

4 Claims, 5 Drawing Figures

DIRECTION OF VEHICLE MOTION

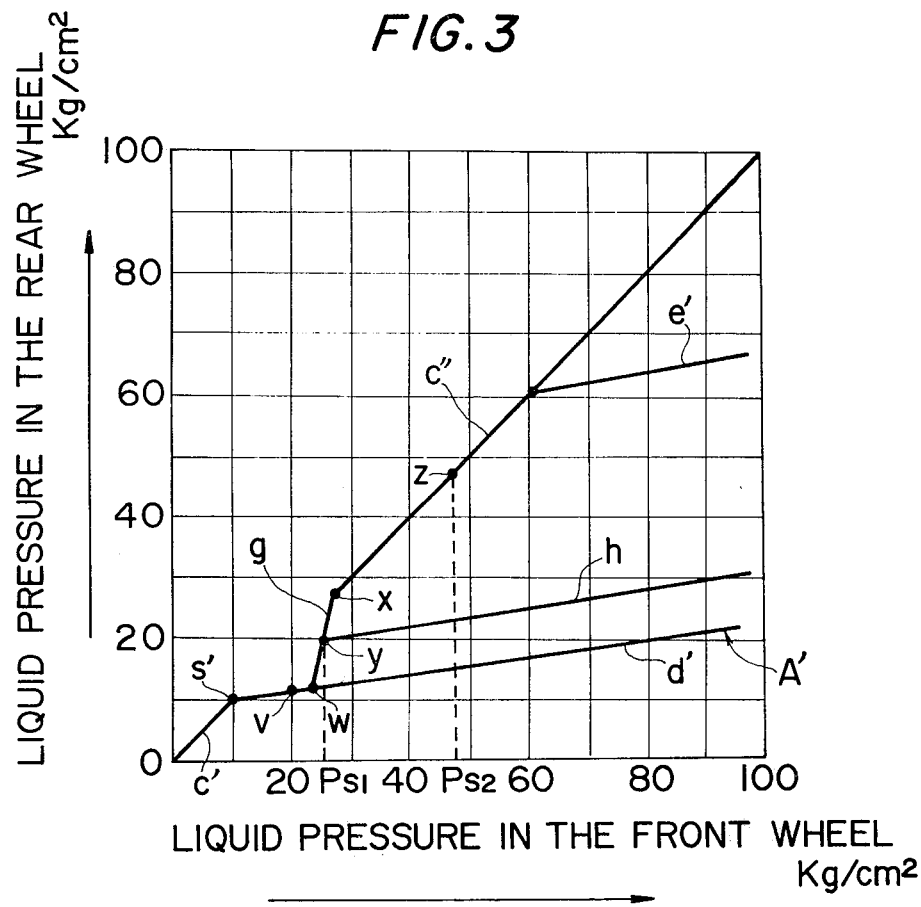
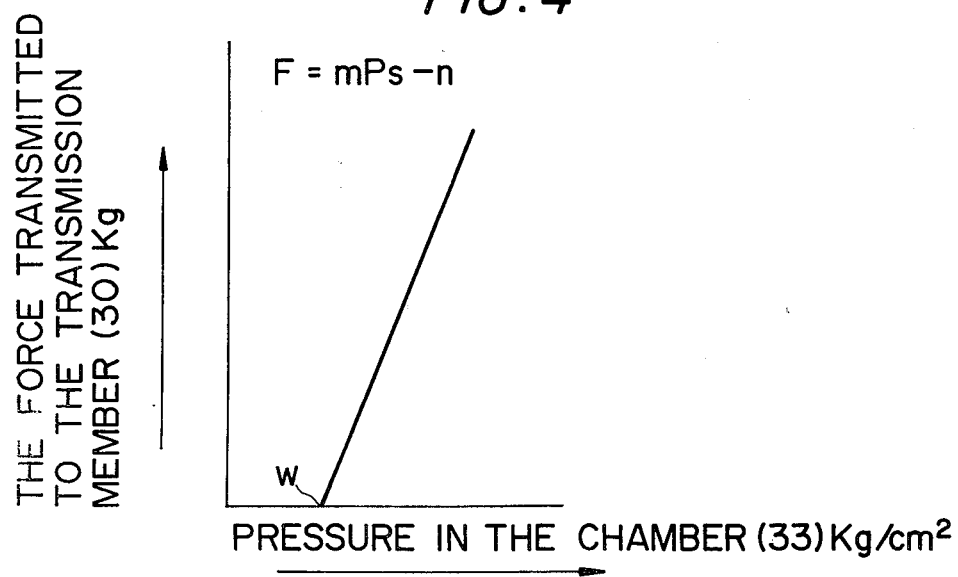

HYDRAULIC BRAKE CONTROL ASSEMBLY

BACKGROUND OF THE INVENTION

The invention relates to a braking fluid pressure control device adapted to provide between front and rear wheels a braking force distribution approximating an ideal braking force distribution curve.

Generally, braking fluid pressure control devices are adapted to provide a braking force distribution between front and rear wheels such as to directly apply a braking fluid pressure to the front and rear wheels when the braking force applied to the front and rear wheels is below a predetermined level and to apply a reduced braking fluid force to the rear wheels when the braking force exceeds the predetermined level.

Braking fluid pressure control devices have already been proposed in the art which employ an inertia valve mechanism including an inertia ball and a valve seat on which the inertia ball is seated for detecting the point at which the control of the baking fluid pressure to be applied to the rear wheels is started. For example, one such control device cmploying an inertia ball is disclosed in U.S. Pat. No. 3,944,293 to Ishigami et al. In conventional fluid pressure control devices having such an inertia valve mechanism, however, it is difficult to provide an ideal braking force distribution between the front and rear wheels either during no load conditions or during load conditions since their proportioning valves are so constructed as to operate when the inertia ball is seated on the valve seat to block the braking fluid flow passage. This will be described in greater detail with reference to FIG. 1, wherein the reference letter $a$ designates an ideal braking fluid pressure distribution curve under no load conditions and the letter $b$ an ideal braking fluid pressure distribution curve under load conditions. It is desirable for the braking fluid pressure to be controlled in accordance with braking fluid pressure distribution curve A made up of line $c$ and line $d$ during no load conditions and in accordance with braking fluid pressure distribution curve B made up of line $c$ and $e$ during load conditions. In the conventional braking fluid pressure control device, however, if the inertia valve mechanism is so constructed that the inertia ball is seated on the valve seat at the reference point $s$ of line $c$ at which the braking deceleration becomes 0.2 g in order to control the braking fluid pressure in accordance with braking fluid pressure distribution curve A during no load conditions, the braking deceleration will become 0.2 g at the reference point $t$ slightly higher than the reference point $s$ during load conditions, although a braking fluid pressure larger than that indicated by the reference point $s$ is required to provide a 0.2 g braking deceleration during load conditions, so that the braking fluid pressure is controlled in accordance with a braking force distribution curve made up of line $c$ and line $f$ during load conditions, which causes lack of braking force.

Furthermore, in the conventional braking fluid control device employing such an inertia valve mechanism, it is difficult to provide a sufficient braking force and the desired vehicle direction stability, particularly in a braking operation under no load condition. The reason for this is that although the inertia ball should be seated on the valve seat at a low vehicle deceleration where the braking fluid pressure distribution curve A is set in a very low position, the inertia ball will not be seated on the valve seat at times due to external factors, such as vehicle vibrations, the vehicle running on slopes or the like, so that the rear wheels will be supplied with an excessively large braking force resulting in skid or with an excessively small braking force resulting in lack of braking force.

SUMMARY OF THE INVENTION

Therefore, the present invention has for its object the provision of an improved braking fluid pressure control device which will be free from the above-mentioned disadvantages found in the conventional devices and which can provide a desirable braking force distribution between the front and rear wheels under any load conditions.

Briefly, according to the present invention, an inlet and an outlet are provided in a body which forms a controlled passage for braking fluid between a dual master cylinder and rear wheel cylinders. The dual master cylinder is conventionally divided into a front oil cylinder for braking the front wheels and a rear oil cylinder for braking the rear wheels, respectively. A proportioning valve is disposed within the body allowing fluid communication between the inlet and the outlet and functioning to reduce at a predetermined rate the braking fluid pressure supplied from the master cylinder to the rear wheel cylinders. The proportioning valve is normally held in its non-operative or open position by the biasing force of a spring member to maintain a suitable supply of brake fluid to the rear wheel cylinders. An inertia ball is disposed in a first chamber which communicates with the master cylinder and the rear wheel cylinders. The first chamber also communicates with a second chamber through a passage to urge said proportioning valve toward the non-operative or open position. Further a flexible disc valve is disposed in the second chamber within the body in a spaced relation to the proportioning valve to transmit the fluid pressure of the second chamber to the proportioning valve. The inertia ball is moved due to the vehicle deceleration to block the passage thereby preventing fluid communication between the master cylinder and the second chamber, whereas the inertia ball is not moved if the vehicle deceleration does not reach a predetermined level to thereby allow fluid communication therebetween and urge the proportioning valve toward the non-operative position resulting in that the fluid supply to the rear cylinders is increased. The flexible disc valve is deformable if the fluid pressure in the second chamber exceeds the predetermined level, but is not deformed below this level even though the communication between the first and second chambers is not blocked by the inertia ball, whereby excessive braking action due to the accidental movement of the inertia ball caused by the vehicle vibration, the vehicle running on a slope or the like can be prevented.

BRIEF DESCRIPTION OF THE DRAWINGS

In the drawings:

FIG. 3 is another graph showing braking fluid pressure distribution curves;

FIG. 4 is a graph showing the characteristic of the disc valve; and

DETAILED DESCRIPTION OF THE PREFERRED EMBODIMENTS

Figure 2:
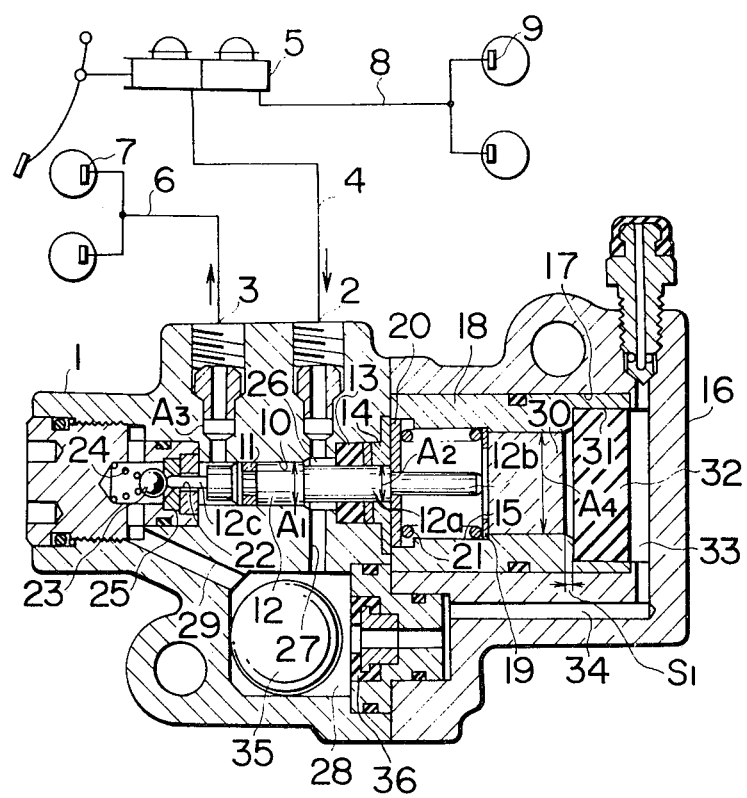
FIG. 2 is a sectional view showing one embodiment of the present invention.

Reference will now be made to the accompanying drawings illustrating preferred embodiments in accordance with the present invention. In FIG. 2, the reference numeral 1 designates a braking fluid pressure control device body, and the numerals 2 and 3 an inlet and an outlet formed in the body 1. The inlet 2 communicates through a conduit 4 with a master cylinder 5, and the outlet 3 communicates through a conduit 6 with rear wheel cylinders 7. As described in detail later, the inlet 2 and the outlet 3 communicate with each other so that the braking fluid pressure produced in the master cylinder 5 can be applied to the rear wheel cylinders 7. The master cylinder 5 is also connected through a conduit 8 to front wheel cylinders 9.

A bore is formed within the body 1 and a plunger 12 is inserted for reciprocating movement within the bore 10. The plunger 12 has thereon a seal member 11, and its one terminal portion is formed with an intermediate diameter portion 12a and a small diameter portion 12b extending through a seal member 13 and a support member 14 into a bore 15 formed in the body 1 and connected coaxially to the bore 10. The plunger 12 also has a rod 12c at the other end thereof. The bore 15 is formed centrally in a sleeve 18 inserted through a seal member in the bore 17 of the body 16 constituting a part of the body 1.

Provided for sliding movement within the bore 15 are a pair of spacers 19 and 20 between which a spring member 21 is interposed to cause the spacer 19 to abut against a stepped portion formed on the inner wall of the sleeve 18 and to cause the spacer 20 to abut against the support member 14 placed at the end of the sleeve 18. The small diameter portion 12b of the plunger 12 extends through the hole formed in the spacer 20. At the other end of plunger 12, the rod 12c extends through a hole 22 to abut against a valve ball 23. A spring member 24 is provided to hold the valve ball 23 on a valve seat 25 formed about the periphery of the hole 22. The spring member 21 is selected to have a resilient force larger than that of the spring member 24 so as to hold the plunger 12 normally in its non-operative position as illustrated in FIG. 2 where the rod 12c retains the valve ball 23 out of contact from the valve seat 25. Under this condition, the inlet 2 and the outlet 3 communicate with each other through a passage 26 formed between the seal member 11 provided on the plunger 12 and the seal member 13 provided in the body 1, a passage 27 connected to the passage 26, a chamber 28, a passage 29, a space between the valve ball 23 and the valve seat 25, and the hole 22 so that the braking fluid pressure can be supplied from the master cylinder 5 into the rear wheel cylinders 7. The plunger 12, the spring member 21, and the valve ball 23 constitute a proportioning valve for reducing the braking fluid pressure from the master cylinder to the rear wheel cylinders at a predetermined rate.

In a large diameter bore 31 communicating with the bore 15 of the sleeve 18 there is provided a disc valve 32 comprising a resilient member placed in spaced relation to a transmission member 30 provided in the bore 15. Behind the disc valve 32 there is formed a chamber 33 which communicates through a passage 34 and the chamber 28 with the master cylinder 5 so that the chamber 33 can be supplied with the braking fluid pressure from the master cylinder 5. When the chamber 33 is supplied with the braking fluid pressure, the disc valve 32 is deformed and extended to the left over the space S1 to push the transmission member 30 and hence the spacer 19 to the left thereby increasing the biasing force of the spring member 21 acting on the plunger 12.

Within the chamber 28 between the master cylinder 5 and the chamber 33, there is contained an inertia ball 35 for controlling the level of the braking fluid pressure to be supplied from the master cylinder 5 into the chamber 33. The inertia ball 35 contained in the chamber 28 is movable in both the forward and rearward directions relative to the vehicle running direction, and a valve seat 36 is provided in the vicinity of the inertia ball 35.

The operation of the braking fluid pressure control device in accordance with the present invention will now be described.

(1) The operation of the braking fluid pressure control device in the case where the inertia ball 35 is seated on the valve seat 36 before the disc valve 32 is deformed under the braking fluid pressure in the chamber 33, for example, under no load conditions:

The braking fluid pressure produced in the master cylinder 5 is supplied through the conduit 8 directly to the front wheel cylinders 9 and at the same time is supplied through the conduit 4, the inlet 2, the passage 26, the chamber 28, the passage 29, the space between the valve ball 23 and the valve seat 25, the hole 22, the outlet 3, and the conduit 6 into the rear wheel cylinders 7 and also through the inlet 2, the passages 26 and 27, the chamber 28, and the passage 34 into the chamber 33 disposed behind the disc valve 32. During the initial stage of braking operation, the inlet 2 and the outlet 3 are connected through a passage with each other so that the braking fluid pressure produced in the master cylinder 5 is directly applied to the rear wheel cylinders 7, while at the same time the braking fluid pressure in the master cylinder 5 is directly supplied to the front wheel cylinders 9. Therefore, the front and rear wheel cylinders 7 and 9 are supplied with the same level of braking fluid pressure as indicated by line $c'$ of FIG. 3. When the braking fluid pressure supplied to the rear wheel cylinders 7 is increased, the plunger 12 moves to the right against the force of the spring member 21 to cause the valve ball 23 to be seated on the valve seat 25 at the reference point $s'$ of FIG. 3. The reason for this is that the area $(A_1-A_2)$ of the stepped portion formed between the plunger body and the intermediate portion 12a is less than the area $(A_1-A_3)$ of the stepped portion formed between the plunger body and the rod 12c. Since the braking fluid pressure acting on these two areas is equal, there is a force differential which tends to move the plunger 12 to the right. When this force differential exceeds the force of spring 21, the plunger 12 moves to the right so that the valve ball 23 is seated on the valve seat 25. With the valve ball 23 seated on the valve seat 25, the pressure acting on the area $(A_1-A_3)$ remains constant. Increasing braking fluid pressure acts only on the area $(A_1-A_2)$ and, to a lesser extent, an area $A_3$ at the end of rod 12c through the valve ball 23. There will be a point where the force due to the increasing fluid pressure acting on the area $(A_1-A_2)$ plus the force due to spring 21 will exceed the force due to the static pressure acting on area $(A_1-A_3)$ plus the small force due to the increasing fluid pressure acting on area $A_3$ through the valve ball 23. When this occurs, the plunger moves to the left to separate the valve ball 23 from the valve seat 25. This allows the braking fluid pressure supplied to the rear brake cylinders to be increased. The process then repeats so that the plunger moves first to the right and then to the left to produce a braking pressure characteristic represented by line $d'$ in FIG. 3. In other words, the braking liquid pressure in the rear wheel cylinders 7 increases at a rate less than that of the increase of the braking liquid pressure in the master cylinder 5.

The relationship between the forces acting on the plunger 12 can be expressed by $$Pr(A_1 - A_3) + PmA_3 = Pm(A_1 - A_2) + Fs \quad (1)$$

where $Pm$ is the pressure in the inlet 2, $Pr$ is the pressure in the outlet 3, $Fs$ is the predetermined force of the spring member 21, $A_1$ is the cross sectional area of the plunger body, $A_2$ is the cross sectional area of the intermediate diameter portion 12a, and $A_3$ is the effective pressure receiving area of the valve ball 23 seated on the valve seat 25.

Equation (1) may be written as $$Pr = \frac{A_1 - A_2 - A_3}{A_1 - A_3} Pm + \frac{Fs}{A_1 - A_3} \quad (2)$$

As can be seen from Equation (2), the braking fluid pressure in the outlet 3, that is, the braking fluid pressure $Pr$ in the rear wheel cylinders 7, is changed as a linear function of the pressure in the outlet 2 and is changed at a constant rate as indicated by line $d'$ of FIG. 3.

Figure 1:
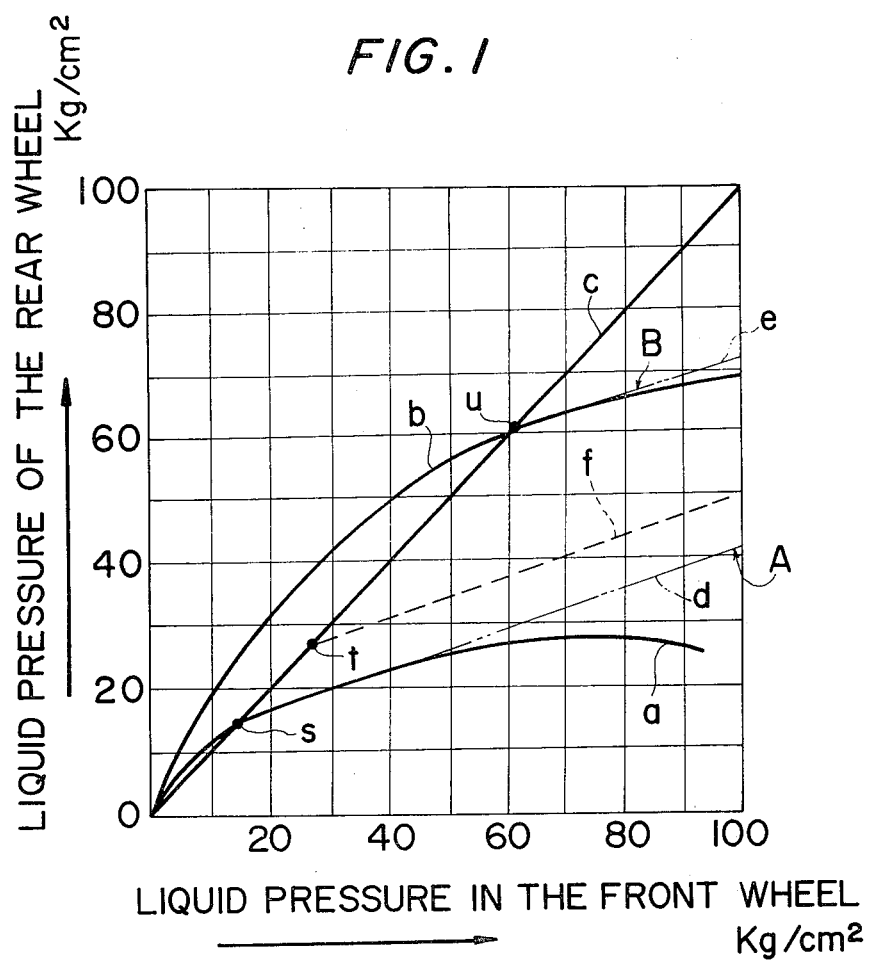
FIG. 1 is a graph showing braking fluid pressure distribution curves.

Under no load conditions, as described above, when the braking fluid pressure supplied to the front and rear wheel cylinders 9 and 7 is increased, before the disc valve 32 is deformed under the braking fluid pressure supplied to the chamber 33, the vehicle deceleration reaches the predetermined level, for example, at the reference point $v$ of FIG. 3 so that the inertia ball 35 is seated on the valve seat 36 to prevent any increase in the braking fluid pressure in the chamber 33. Under this condition the force to move the plunger 12 to the left is created only by the force of the spring member 21 and the braking fluid pressure differential between inlet 2 and oulet 3, and the pressure to the front and rear wheel cylinders is controlled in accordance with the braking fluid pressure distribution curve A' corresponding to the curve A of FIG. 1.

(2) The operation of the braking fluid pressure control device in the case where the disc valve 32 is deformed under the braking fluid pressure in the chamber 33 to transmit the force through the transmission member 30 to the plunger 12 before the inertia ball 35 is seated on the valve seat 36, for example where the vehicle deceleration cannot reach the predetermined level even when the braking fluid pressure is increased such as under excessive load conditions:

In this case, the same operation is performed as described above during the initial stage of braking operation so that the braking fluid pressure distribution between the front and rear wheel cylinders is effected in accordance with lines $c'$ and $d'$ of FIG. 3, but the inertia ball 35 cannot be seated on the valve seat 36 since the vehicle deceleration does not reach the predetermined level. Thus, the braking fluid pressure in the chamber 33 is increased with increasing braking fluid pressure in the master cylinder, and the disc valve 32 is deformed over the space $S_1$ so as to transmit the braking fluid pressure in the chamber 33 to the transmission member 30 at the reference point $w$ of FIG. 3.

The disc valve 32 may have a characteristic as shown in FIG. 4 such that the disc valve 32 cannot transmit the force to the transmission member 30 before the braking fluid pressure in the chamber 33 reaches the predetermined level indicated by the reference point $w$ and the disc valve 32 can transmit the force expressed by the following equation when the braking fluid pressure exceeds the predetermined level:

$$F = m \cdot Ps - n \quad (3)$$

where $F$ is the force transmitted to the transmission member 30, $Ps$ is the braking fluid pressure in the chamber 33, and $m$ and $n$ are constants. Also, the disc valve 32 may have a non-linear characteristic instead of the linear characteristic expressed by Equation (3). Equation (3) may be approximately expressed by $$F = A_4 \cdot Ps - n \quad (4)$$

where $A_4$ is the cross sectional area of the transmission member 30.

Assuming that the disc valve 32 has a characteristic expressed by Equation (4) and $Ps = Pm$, the relation between the forces acting on the plunger 12 is expressed by the following equation after addition of F given by Equation (4) to the right side of Equation (1):

$$Pr = \frac{A_1 - A_2 - A_3 + A_4}{A_1 - A_3} Pm - \frac{n - Fs}{A_1 - A_3} \quad (5)$$

Equation (5) is illustrated by line $g$ of FIG. 3.

When the disc valve 32 transmits the braking fluid pressure in the chamber 33 through the transmission member 30 to the plunger 12, the plunger 12 moves to the left. When the braking fluid pressure $Ps$ or $Pm$ introduced in the chamber 33 exceeds the level indicated by the reference point $x$ of FIG. 3, the plunger 12 is subject to the force transmitted through the transmission member 30 from the disc valve 32 to be held in its non-operative position so that the valve ball 23 is held in its opened position and the front and rear wheel cylinders 7 and 9 are supplied with the braking liquid pressure substantially having the same level (see line $c''$ of FIG. 3), whereby a strong braking operation is effected by the front and rear wheel cylinders.

(3) The operation of the braking fluid pressure control device in the case where the inertia ball 35 is seated on the valve seat 36 while the disc valve 32 is deformed under the braking fluid pressure in the chamber 33 so as to transmit the force through the transmission member 30 to the plunger 12, for example under low load conditions:

Assuming that the vehicle deceleration reaches the predetermined level and the inertia ball 35 is seated on the valve seat 36 at the reference point $y$ of the line $g$, the communication between the master cylinder 5 and the chamber 33 is blocked, and the chamber 33 is not supplied with increasing braking fluid pressure. In this case, the forces acting on the plunger 12 can be expressed from Equations (2) and (4) as $$Pr = \frac{A_1 - A_2 - A_3}{A_1 - A_3} Pm + \frac{Fs + A_4 \cdot Ps_1 - n}{A_1 - A_3} \quad (6)$$

where $Ps_1$ is the pressure within the chamber 33 when the inertia ball 35 is seated on the valve seat 36. This equation is indicated by line $h$ parallel to line $d'$.

On the other hand, during braking operation under normal load conditions, the vehicle deceleration reaches the predetermined level at the reference point z of line c''. Under this condition, the forces acting on the plunger 12 can be expressed by:

$$Pr = \frac{A_1 - A_2 - A_3}{A_1 - A_3} Pm + \frac{Fs + A_4 \cdot Ps_2 - n}{A_1 - A_3} \quad (7)$$

where $Ps_2$ is the pressure within the chamber 33 under this condition. In this case, the pressure $Ps_2$ at which the inertia ball 35 is seated on the valve seat 36 is obtained at the reference point z. Equation (7) is illustrated by line e' of FIG. 3. The pressure at which the inertia ball 35 is seated on the valve seat 36 can be changed by changing the cross sectional area of the transmission member 30.

Figure 5:
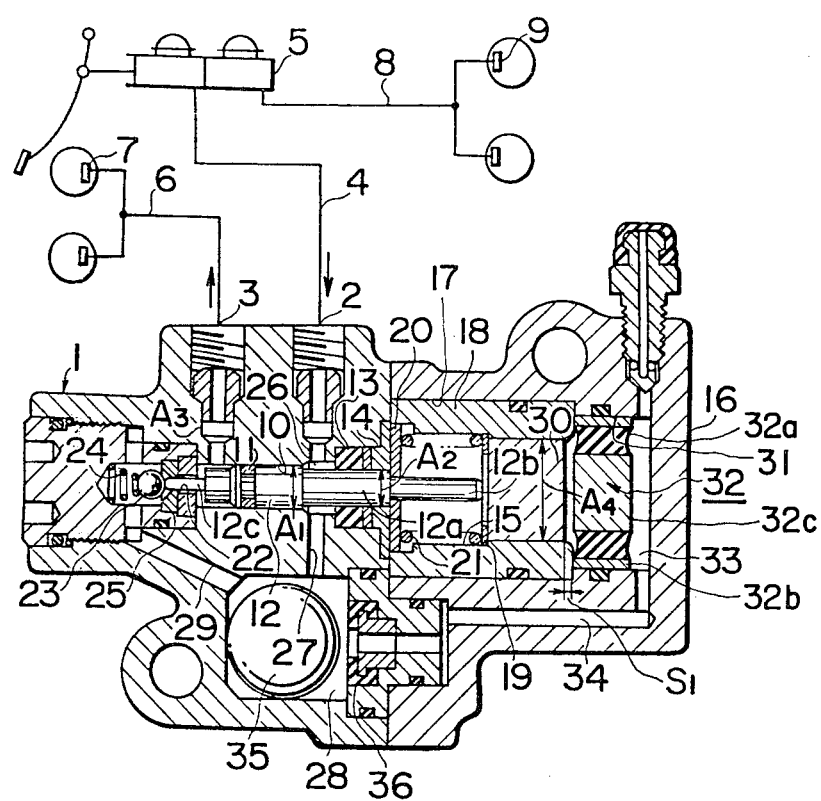
FIG. 5 is a sectional view showing an alternative embodiment according to the present invention.

FIG. 5 illustrates an alternative embodiment of the braking fluid pressure control device according to the present invention, which is substantially similar to the first described embodiment except that the disc valve 32 is composed of a resilient member 32a, a rigid annular member 32b disposed around the resilient member 32a, and a rigid shaft 32c suspended by the resilient member 32a.

As described above, the braking fluid pressure control device constructed in accordance with the present invention comprises an inertia ball operable in accordance with vehicle deceleration, and a disc valve deformable under the braking fluid pressure controlled by the inertia ball so as to move the proportioning valve to its non-operative position when the braking fluid pressure exceeds a predetermined level. First of all, the proportioning valve is operated to control the braking force applied to the rear wheels. When a predetermined vehicle deceleration level is obtained thereby, the inertia ball is then operated to prevent the action of the disc valve on the proportioning valve thereby providing a stable characteristic under no load conditions. On the other hand, where the predetermined vehicle deceleration level cannot be obtained due to the operation of the proportioning valve, the disc valve is operated to move the proportioning valve to its non-operative position and restrict the function of the proportioning valve so as to increase the braking force applied to the rear wheels. When this provides the predetermined vehicle deceleration level, the inertia ball is seated to re-operate the proportioning valve thereby providing a stable characteristic under load conditions.

What is claimed is:

1. In a braking fluid pressure control device of the type comprising a body formed with an inlet and an outlet respectively communicating with a master cylinder and rear wheel cylinders, a proportioning valve contained within the body for reciprocating movement therein, a spring member for biasing said proportioning valve towards its non-operative position to allow communication of said inlet with said outlet, said proportioning valve acting against said spring member due to increasing brake fluid pressure to reduce at a predetermined rate the braking fluid pressure supplied from said master cylinder to said rear wheel cylinders, the improvement comprising:
   a disc valve operative when actuated to stop reciprocating movement of said proportioning valve, said disc valve being disposed within said body in spaced relation to said proportioning valve, said disc valve being deformable under fluid pressure supplied to a chamber within said body which communicates through a passage with said master cylinder, actuation of said disc valve by said deformation causing said proportioning valve to move to its non-operative position,
   a transmission member interposed between said disc valve and said proportioning valve, and
   an inertia ball interposed in said passage for blocking said passage when deceleration exceeds a predetermined level to prevent further actuation of said disc valve.

2. The improvement in a braking fluid pressure control device as recited in claim 1 wherein said disc valve becomes deformed only when the pressure in said chamber exceeds a predetermined level.

3. The improvement in a braking fluid pressure control device as recited in claim 1 wherein said disc valve comprises a resilient member sealingly positioned between said chamber and said transmission member, said resilient member acting on said transmission member with increasing fluid pressure in said chamber to move said proportioning valve to its non-operative position.

4. In a braking fluid pressure control device of the type comprising a body formed with an inlet and an outlet respectively communicating with a master cylinder and rear wheel cylinders, a proportioning valve contained within the body for reciprocating movement therein, a spring member for biasing said proportioning valve towards its non-operative position to allow communication of said inlet with said outlet, said proportioning valve acting against said spring member due to increasing brake fluid pressure to reduce at a predetermined rate the braking fluid pressure supplied from said master cylinder to said rear wheel cylinders, the improvement comprising:
   a disc valve operative when actuated to stop reciprocating movement of said proportioning valve, said disc valve being disposed within said body in spaced relation to said proportioning valve, said disc valve being deformable under fluid pressure supplied to a chamber within said body which communicates through a passage with said master cylinder, actuation of said disc valve by said deformation causing said proportioning valve to move to its non-operative position,
   a transmission member interposed between said disc valve and said proportioning valve, and
   an inertia ball interposed in said passage for blocking said passage when deceleration exceeds a predetermined level to prevent further actuation of said disc valve, and
   wherein said disc valve comprises:
   a resilient member,
   a rigid annular member disposed around said resilient member, and
   a rigid shaft suspended by said resilient member, said disc valve being sealingly positioned between said chamber and said transmission member, said rigid shaft acting on said transmission member with increasing fluid pressure in said chamber to move said proportioning valve to its non-operative position.

* * * * *